(12) United States Patent
Argersinger

(10) Patent No.: US 12,092,220 B2
(45) Date of Patent: *Sep. 17, 2024

(54) PIPE FLOOR/WALL PENETRATION BELLOWS SEAL

(71) Applicant: Flex-Hose Co., Inc., East Syracust, NY (US)

(72) Inventor: Philip B. Argersinger, Santa Rosa Beach, FL (US)

(73) Assignee: Flex-Hose Co., Inc., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,848

(22) Filed: Jan. 10, 2022

(65) Prior Publication Data

US 2022/0128154 A1    Apr. 28, 2022

Related U.S. Application Data

(63) Continuation of application No. 15/875,019, filed on Jan. 19, 2018, now Pat. No. 11,221,075.

(51) Int. Cl.
*F16J 15/36* (2006.01)
*F16L 5/02* (2006.01)
(Continued)

(52) U.S. Cl.
CPC ............. *F16J 15/366* (2013.01); *F16L 5/025* (2013.01); *F16L 5/04* (2013.01); *F16L 5/10* (2013.01); *F16L 51/025* (2013.01); *F16L 51/00* (2013.01)

(58) Field of Classification Search
CPC .. F16J 15/366; F16L 5/025; F16L 5/04; F16L 5/10; F16L 51/025; F16L 51/00
See application file for complete search history.

(56) References Cited

U.S. PATENT DOCUMENTS 1,873,703 A  *  8/1932  Giesler ................. F16L 51/025
                                                      285/332
5,361,577 A  *  11/1994  Cromer .................... F23R 3/48
                                                      285/227
(Continued)

FOREIGN PATENT DOCUMENTS

JP        53135617      *  3/1952
JP        55-119480     *  2/1954
(Continued)

*Primary Examiner* — James M Hewitt, II
(74) *Attorney, Agent, or Firm* — Bond, Schoeneck & King, PLLC; Frederick J. M. Price

(57) ABSTRACT

A sealing system including a first end and a second end with flexible bellows extending therebetween. The first end includes a base plate with an inner ring having an inner diameter. The inner ring is configured to receive a pipe therethrough. The pipe has an outer diameter, which is smaller than the inner diameter of the inner ring. The bellows of the sealing system has a first length in a first position and second length in a second position. Upon axial expansion of the pipe, the bellows is configured to move from the first position to the second position. The sealing system may also comprise a mechanical protective element, such as a shroud which extends around the bellows. Movement of the bellows can be further limited with rods extending from the shroud to a surrounding substrate or a cable fixing a maximum distance between the pipe and the shroud.

25 Claims, 7 Drawing Sheets

(51) Int. Cl.
  *F16L 5/04*   (2006.01)
  *F16L 5/10*   (2006.01)
  *F16L 51/02*  (2006.01)
  *F16L 51/00*  (2006.01)

(56) References Cited

U.S. PATENT DOCUMENTS

| | | | | |
|---|---|---|---|---|
| 5,452,551 | A * | 9/1995 | Charland | A62C 2/065 |
| | | | | 52/220.8 |
| 7,566,221 | B2 * | 7/2009 | Garcia | F27D 99/0073 |
| | | | | 432/115 |
| 2014/0260016 | A1 * | 9/2014 | Langille | F16L 5/08 |
| | | | | 52/232 |
| 2015/0076814 | A1 * | 3/2015 | Lucky | F16L 51/025 |
| | | | | 285/226 |

FOREIGN PATENT DOCUMENTS

| | | | |
|---|---|---|---|
| JP | 4-8884 | * | 1/1992 |
| JP | 2001288765 A | * | 10/2001 |
| JP | 2002369324 A | * | 12/2002 |
| JP | 2009526957 A | * | 7/2009 |

* cited by examiner

PIPE FLOOR/WALL PENETRATION BELLOWS SEAL

CROSS-REFERENCE TO RELATED APPLICATIONS

The present application is a continuation of U.S. Non Provisional patent application Ser. No. 15/875,019, filed on Jan. 19, 2018 (now U.S. Pat. No. 11,221,075) the entire contents of which are hereby incorporated by reference.

BACKGROUND OF THE INVENTION

1. Field of Invention

This invention relates generally to fire stops for pipes and, more particularly, to a metal bellows fire seal for commercial mechanical and plumbing pipes.

2. Description of the Related Art

In multi-story buildings, commercial mechanical and plumbing pipes pass through floor and wall penetrations. When the pipes are installed, the pipes are not completely flush with the floor or wall. In other words, the outer diameter of the pipe is not equal to the diameter of the hole in the floor or wall. The inner diameter of the hole in the floor or wall is purposefully larger than the outer diameter of the pipe to accommodate thermal growth/expansion of long lengths of pipe.

However, the space to accommodate thermal growth between the pipe and the wall or floor can lead to hazardous conditions. For example, in the event of a fire on one floor of a building, the fire can spread rapidly through the space between the pipe and the floor, such that the fire enters an adjacent story of the building. To protect against the spread of fire, fire stops are used to seal the space between the pipe and the wall or floor.

Traditionally, the fire stops are comprised of a fire resistant caulk seal that is filled in the gap between the pipe and the wall or floor. Other materials or combinations of materials, such as caustics, mastics, fiberglass, and wool, have been used to fill the gaps. After the caulk seal is filled around the pipe, the caulk seal material dries and hardens. However, as long length of pipe grow thermally and expand under certain conditions the fire resistant caulk seal cracks and breaks under pressure. Therefore, the fire resistant caulk seals need to be replaced often and quickly to continuously be configured to prevent the spread of fire.

Other materials have been used to construct the fire stop. For example, rubber rings and silicone sleeves have been used to surround the pipe, filling the space between the pipe and the wall or floor. However, rubber rings and silicone sleeves need have issues with air tightness to effectively prevent the spread of fire. Further, rubber, silicone, and many of the other materials listed above, although somewhat fire resistant, can still be consumed by the fire over time (i.e., over the course of a fire).

Therefore, there is a need for a fire stop sealing system that is air tight and fireproof while still accommodating axial expansion of the pipe.

SUMMARY OF THE INVENTION

The present invention recognizes that there are potential problems and/or disadvantages in the above-discussed conventional fire stops. In one aspect of the present application, a sealing system is provided. The sealing system includes a first end and a second end with flexible bellows extending therebetween. The first end includes a base plate with an inner ring having an inner diameter. The inner ring is configured to receive a pipe therethrough. The pipe has an outer diameter, which is smaller than the inner diameter of the inner ring. The bellows of the sealing system has a first length in a first position and second length in a second position. Upon axial expansion of the pipe, the bellows moves from the first position to the second position.

In another aspect of the present application, an alternative embodiment of a sealing system is provided. The sealing system includes flexible bellows extending between a first end and a second end. The first end includes a base plate having an inner ring with an inner diameter. The inner ring is configured to receive a pipe therethrough. The pipe has an outer diameter, which is smaller than the inner diameter of the inner ring. The sealing system also comprises one or more connectors attaching the base plate to a substrate, wherein the pipe extends through an aperture in the substrate. Further, the bellows has a first length in a first position and a second length in a second position. Upon axial expansion of the pipe, the bellows move from the first position to the second position.

Additional features and advantages are realized through the techniques of the present invention. Other embodiments and aspects of the invention are described in detail herein and are considered a part of the claimed invention.

BRIEF DESCRIPTION OF THE DRAWINGS

The present invention will be more fully understood and appreciated by reading the following Detailed Description in conjunction with the accompanying drawings, in which:

FIG. 1A-2 is a front cross-section schematic representation of a sealing system according to an embodiment;

FIG. 1A-3 is a front cross-section schematic representation of a sealing system according to an embodiment;

FIG. 2 is a front cross-section schematic representation of a sealing system according to an alternative embodiment; and FIG. 3 is a front complete non-cross-section schematic representation of a sealing system of FIG. 2 according to an embodiment.

DETAILED DESCRIPTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figures 1, 1A:
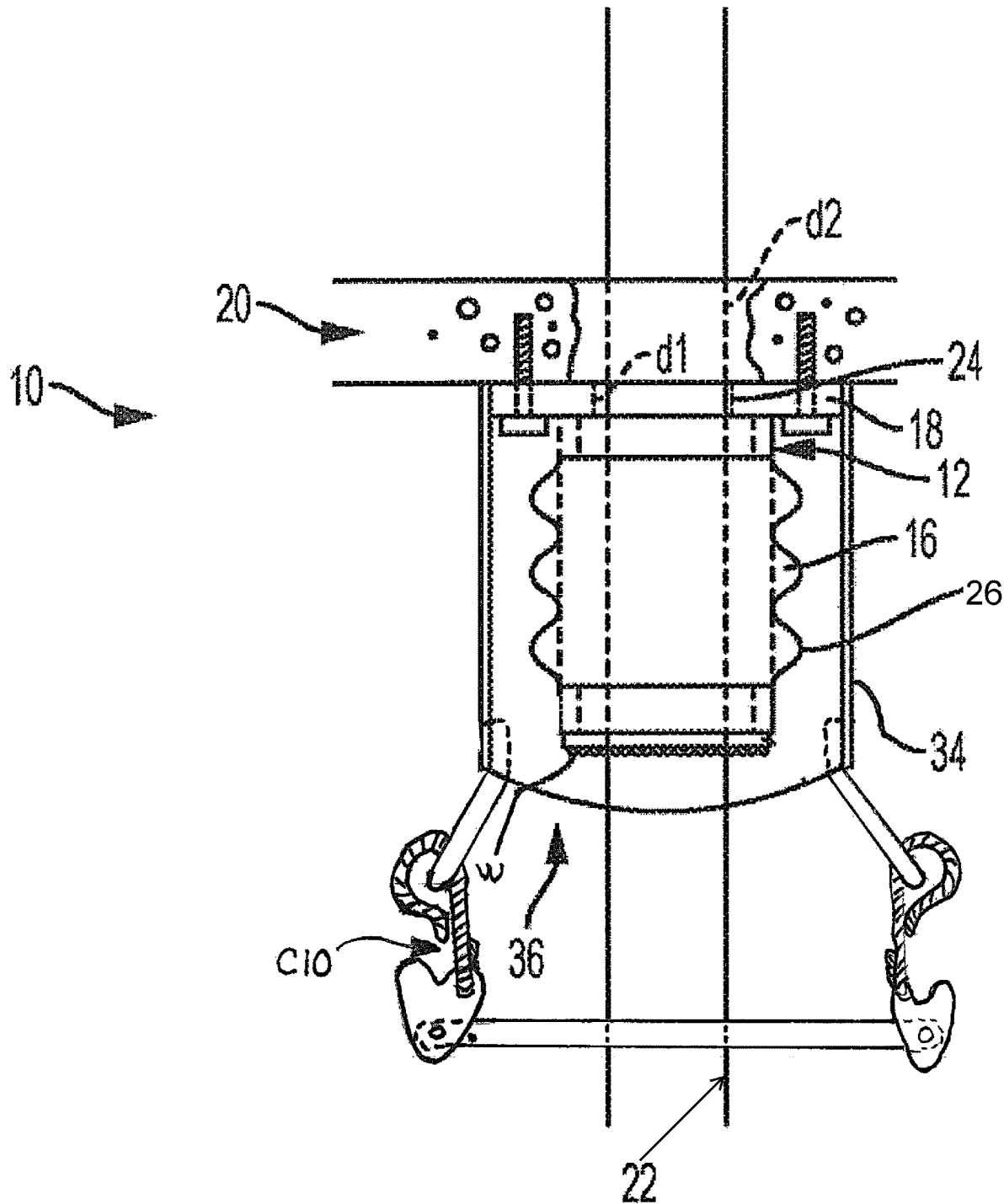
FIG. 1A-1 is a front cross-section schematic representation of a sealing system according to an embodiment.

Referring now to FIG. 1A, there is shown a sealing system according to an embodiment. The sealing system 10 comprises a first end 12 and a second end 14 with flexible bellows 16 extending therebetween. In one embodiment, the bellows 16 is comprised of stainless steel, which is flexible and is configured to withstand high temperatures (as should be understood by a person of ordinary skill in the art in conjunction with a review of this disclosure). However, other materials may be used, such as carbon steel, copper, and the like. In one embodiment, the bellows 16 is comprised of a material that matches the adjoining schedule.

The first end 12 of the sealing system 10 comprises a base plate 18, which is used to secure the sealing system 10 to a floor or a wall 20. The base plate 18, which has an inner diameter (d1) sized to fit over the outer diameter (d2) of an existing pipe 22. In FIG. 1A, the ring is the inner diameter of base plate 18. The base plate/ring may be composed of metal, such as stainless steel, carbon steel, copper or the composition of the adjoining schedule/piping.

As the baseplate/ring 18 has an inner diameter (d1) to fit over the outer diameter (d2) of the existing pipe 22, there is a gap 24 between the ring of the base plate 18 and the pipe 22. In the depicted embodiment, the gap 24 between the base plate 18 and the pipe 22 is even around the outer diameter of the pipe 22. Thus, the base plate 18 provides a centered hole in the irregular floor or wall 20 penetrations. As the gap 24 provides substantially equal space between the base plate 18 and the pipe 22 around the outer diameter of the pipe 22, the base plate 18 (and ring) helps to guide the pipe 22 axially during thermal growth, while accommodating any lateral motion of the pipe 22. So this inner diameter (d1) of the base plate 18 is configured to function as a pipe guide to direct the thermal growth of the pipe longitudinally, eliminating the need for conventional pipe guides (such as a spider guide, as should be understood by a person of ordinary skill in the art in conjunction with a review of this disclosure).

Still referring to FIG. 1A, as stated above, the sealing system 10 has flexible bellows 16 connected between the first end 12 and the second end 14. The second end 14 is positioned along the pipe 22, wherein the first end 12 is between the base plate 18 and the second end 14. As shown in FIG. 1A, the bellows 16 comprise a concertinaed surface 26. The concertinaed surface 26 may include ridges which are rounded, pointed, or some other related configuration.

The bellows 16 has a concertinaed surface 26 and is flexible in order to accommodate axial expansion of the pipe. In a first relaxed position, the bellows 16 has a first length as shown in FIG. 1A. In a second compressed position, the bellows 16 has a second length, which is smaller than the first length (see FIG. 1B). In a third extended position, the bellows 16 has a third length, which is longer than the first length. Thus, as the pipe 22 expands axially, the bellows 16 is configured to either compress (upward as looking at FIG. 1B) from the first length to the second shorter length, or to expand (downward as looking at FIG. 1C) from the first length to the third longer length to accommodate the movement of the pipe 22.

The bellows 16 are connected or otherwise attached to the pipe 22 via conventional connectors or connection methods (as should be understood by a person of ordinary skill in the art in conjunction with a review of this disclosure).

For example, FIG. 1A depicts one embodiment of a connection method wherein the bellows 16 is welded to the pipe 22. In such an embodiment, the bellows 16 is welded at both the first end 12 and the second end 14 of the sealing system 10 at two locations, which are spaced apart along the pipe 22. Further, in the depicted embodiment, end fitting 12 is welded to base plate 18. In addition, base plate 18 is configured to be waterproof, a fire resistant sealant or gasket can be applied to the free end, and the base plate 18 can be attached to the floor or wall structure by conventional fastening methods (such as concrete anchors and bolts, or similar methods as should be understood by a person of ordinary skill in conjunction with a review of this disclosure) On the opposing side of the sealing system 10, the second end 14 of the bellows 16 is welded to a cap ring 28 of the sealing system 10 by field weld w which is made around the complete circumference of pipe 22 while the bellows 16 is in its neutral position. As shown in FIG. 1A, the cap ring 28 is located distal the second end 14 of the bellows 16 relative to the floor or wall 20 penetration. In an alternative embodiment, the second end 14 of the bellows 16 is welded to a kerf in the pipe 22.

Figures 1, 1A, 2:
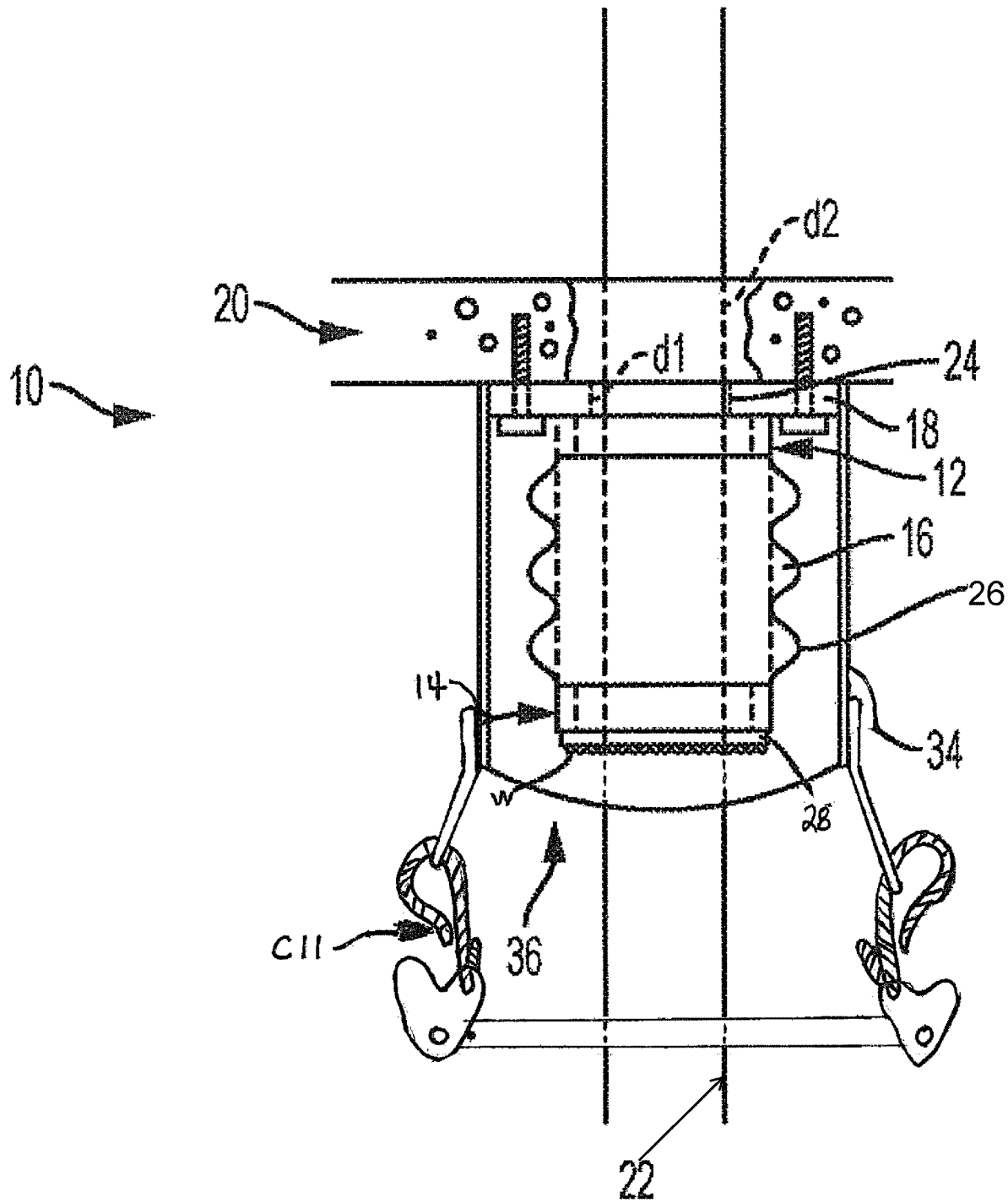
Figures 1, 1A, 2, 3:
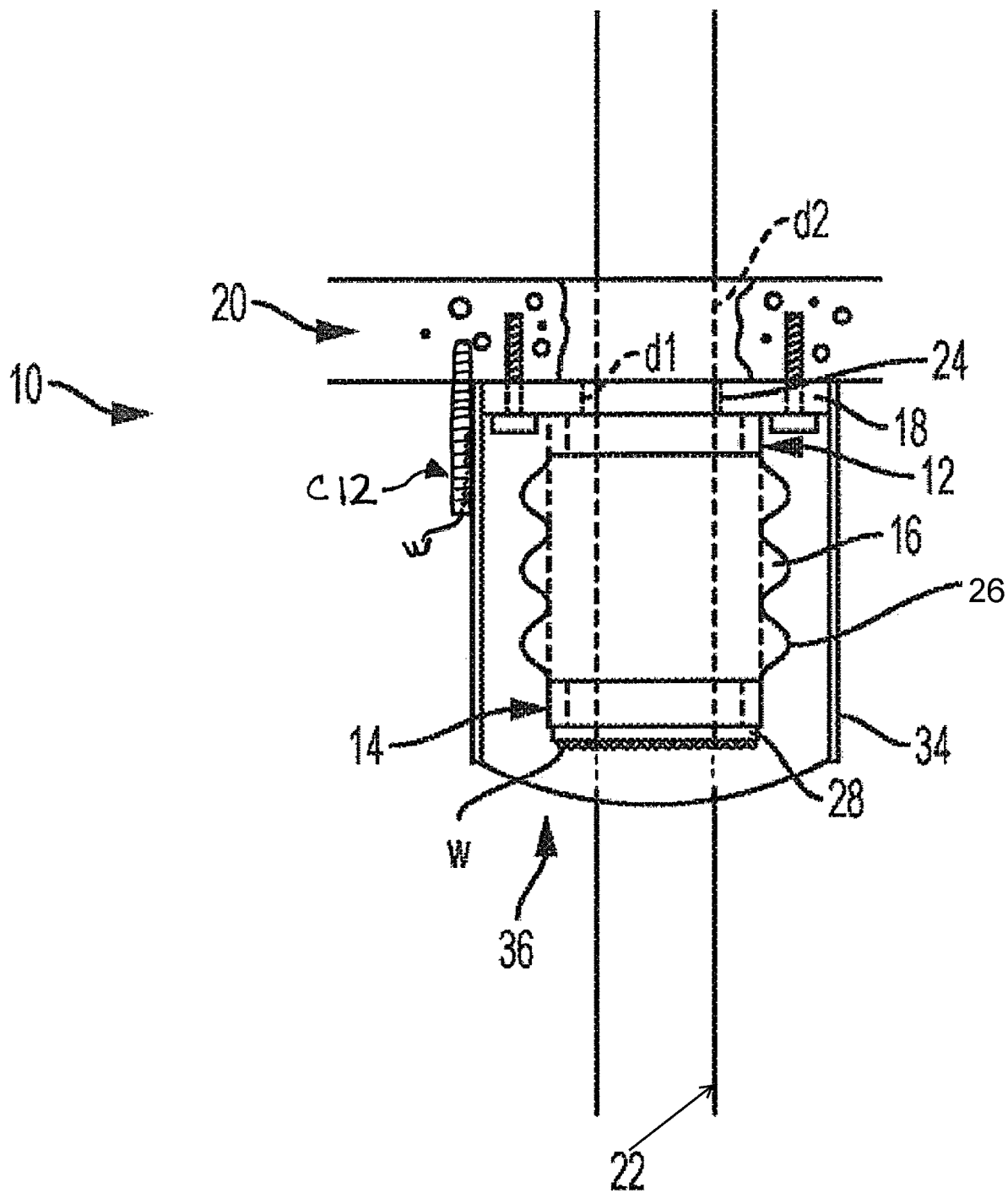
Figure 1B:
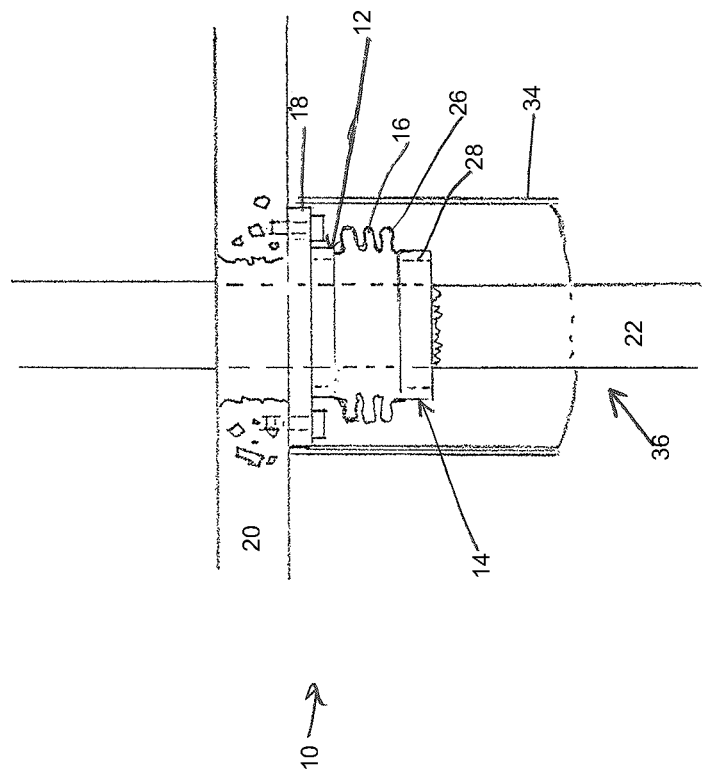
FIG. 1B is a front cross-section schematic representation of a sealing system of FIG. 1A in a compressed configuration according to an embodiment.
Figure 1C:
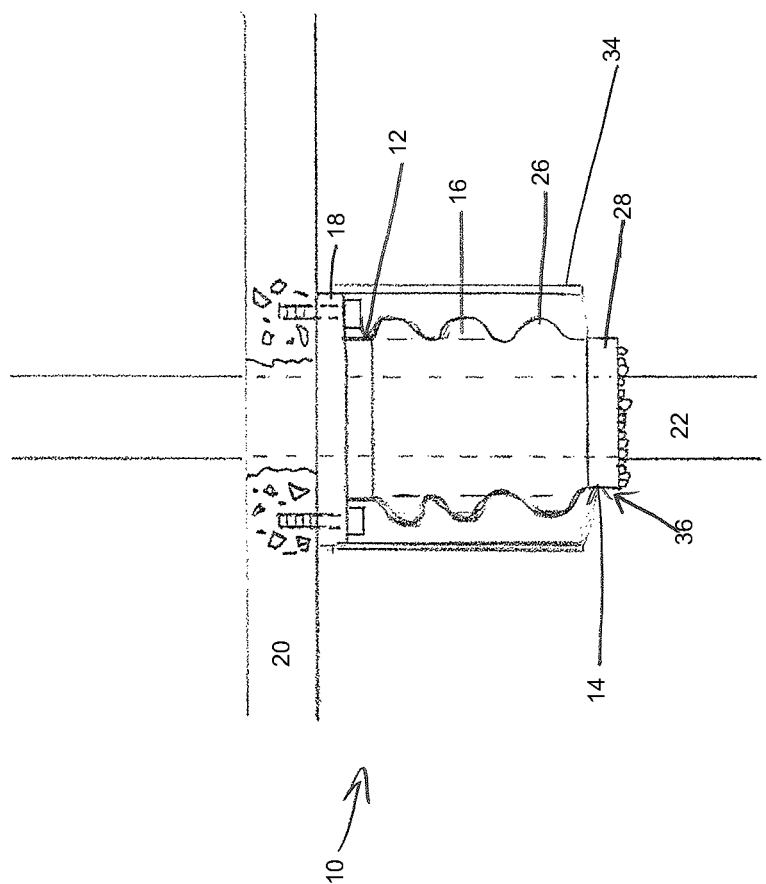
FIG. 1C is a front cross-section schematic representation of a sealing system of FIG. 1A in an extended configuration according to an embodiment.
Figure 2:
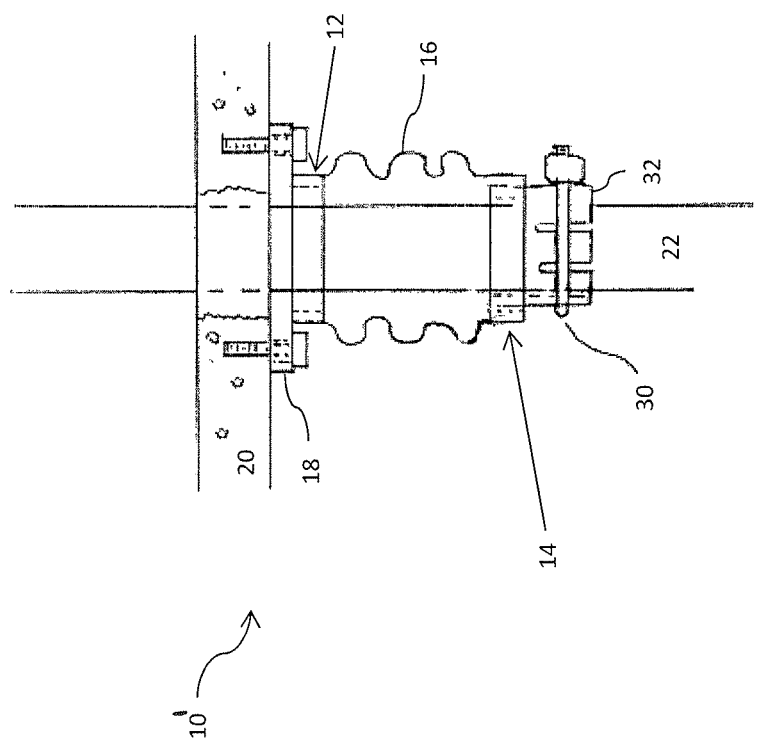
Figure 3:
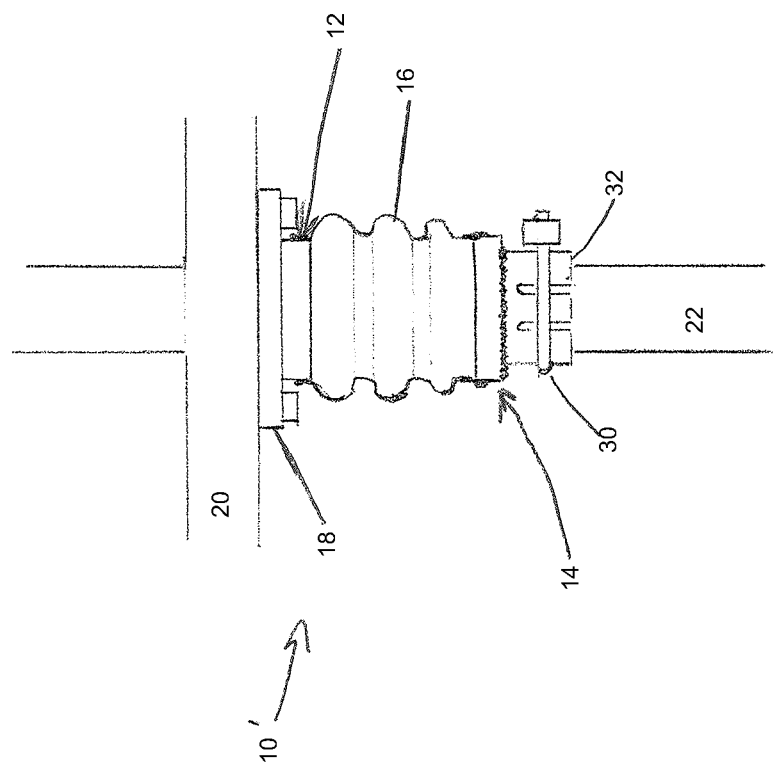

Turning to FIG. 2, there is shown a sealing system 10' according to an alternative embodiment. Referring to FIG. 3, a front complete non-cross-section schematic representation of a sealing system 10' of FIG. 2 is shown. The sealing system 10' is similar in many respects to sealing system 10. However, the sealing system 10' in FIG. 2 is connected to the pipe 22 near second end 14 via an alternative connection mechanism. In such instances wherein it is impractical, inefficient, or otherwise impossible to weld the sealing system 10 to the pipe 22, an in-field U-bolt 30 (or similar non-permanent connection, as should be appreciated and understood by those of ordinary skill in the art in conjunction with a review of this disclosure, may be used). In the depicted embodiment, the sealing system 10 is connected to the pipe 22 near second end 14 with a U-bolt 30 secured around a kerfed tube 32. In the depicted embodiment, the kerfed tube 32 is distal the second end 14 of the sealing system 10 relative to the floor or wall 20 penetration. The kerfed tube 32 may also be distal a cap ring 28 located at the second end 14 of the bellows 16. The U-bolt 30 extends over the kerfed tube 32, as shown. Other conventional connectors similar to the U-bolt 30 may be used.

Referring back to FIG. 1A, another embodiment of the sealing system 10 may alternatively comprise a removable shroud 34. The removable shroud 34 can be composed of metal, such as stainless steel or carbon steel, for example. The shroud 34 can be attached to a flange bolted to the floor or wall 20. Further, in the depicted embodiment, the shroud 34 has an open end 36, which is proximal relative to the second end 14 of the bellows 16. The shroud 34 surrounds a substantial portion of the bellows 16, providing mechanical protection.

In additional embodiments, limiting devices may be added to limit or otherwise constrain movement of the bellows 16. For instance, one embodiment of the sealing system 10 may comprise one or more rods which extend from the exterior of the protective shroud 34. From the exterior of the shroud 34, the rods can extend to a location along the floor or wall 20 that is connected to the first end 12 of the sealing system 10. Alternatively, the rods may also extend to a floor or wall which is adjacent and/or substantially parallel to the pipe 22 surrounded by the sealing system 10. As shown in FIG. 1A-1, for example, a cable or rod C10 can be fixed to the pipe 22 at one end and an interior of the shroud 34 at a second end. As shown in FIG. 1A-2, a cable or rod C11 can also be fixed to the pipe 22 at one end and an exterior of the shroud 34 at a second end. In addition, as shown in FIG. 1A-3, a cable or rod C12 can extend from an exterior of the shroud 34 to an adjacent substrate 20.

In another embodiment, the limiting device can be a cable welded to the pipe 22 which is encased by the sealing system 10. The cable may extend from a welding location on the pipe 22 to a location on the interior of the shroud 34. Alternatively, the cable may extend from the welding location on the pipe 22 to a location on the exterior of the shroud 34. In both implementations of the cable limiting device, the cable may be welded or attached by some other conventional means to the shroud 34.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

I claim:

1. A fire stop sealing system for creating a fire seal between a pipe and a substrate, comprising:
    a flexible bellows extending between a first end and a second end, wherein a diameter of the first end is smaller than a largest diameter of the flexible bellows, the first end is connected to a base plate, the base plate is configured to attach to the substrate comprising a wall, a floor or a ceiling, the base plate includes an inner ring having an inner surface with an inner diameter;
    wherein the inner ring receives the pipe therethrough, the pipe having an outer surface with an outer diameter, which is smaller than the inner diameter of the inner ring, and wherein the inner ring forms a gap between the entirety of the inner surface of the inner ring and an adjacent portion of the outer surface of the pipe to maintain a substantially equal space within the gap between the entirety of the inner surface of the inner ring and the adjacent portion of the outer surface of the pipe sufficient to guide the pipe axially during the axial movement or expansion of the pipe and to accommodate the lateral motion of the pipe while maintaining the fire seal;
    the bellows having a first length in a first position and a second length in a second position; and
    wherein the bellows is configured to move from the first position to the second position upon axial expansion of the pipe.

2. The sealing system of claim 1, wherein the second length is shorter than the first length.

3. The sealing system of claim 1, wherein the second length is longer than the first length.

4. The sealing system of claim 1, further comprising a shroud positioned adjacent to the baseplate and extending around the bellows.

5. The sealing system of claim 4, wherein the shroud has an open end.

6. The sealing system of claim 1, further comprising a cap ring welded to the second end.

7. The sealing system of claim 1, wherein the bellows comprise a concertinaed surface.

8. The sealing system of claim 7, wherein the concertinaed surface comprises a plurality of rounded ridges.

9. The sealing system of claim 1, wherein the bellows is composed of stainless steel or carbon steel.

10. The sealing system of claim 4, further comprising a cable fixed to the pipe at one end and an interior of the shroud at a second end.

11. The sealing system of claim 4, further comprising a cable fixed to the pipe at one end and an exterior of the shroud at a second end.

12. The sealing system of claim 4, further comprising one or more rods extending from an exterior of the shroud to an adjacent substrate.

13. A fire stop sealing system for creating a fire seal between a pipe and a substrate comprising:
    a flexible bellows extending between a first end and a second end, wherein a diameter of the first end is smaller than a largest diameter of the flexible bellows, the first end is connected to a base plate, the base plate is configured to attach to the substrate comprising a wall, a floor or a ceiling, the base plate includes an inner ring having an inner surface with an inner diameter;
    wherein the inner ring receives the pipe therethrough, the pipe having an outer surface with an outer diameter, which is smaller than the inner diameter of the inner ring, and wherein the inner ring forms a gap between the entirety of the inner surface of the inner ring and an adjacent portion of the outer surface of the pipe to maintain a substantially equal space within the gap between the entirety of the inner surface of the inner ring and the adjacent portion of the outer surface of the pipe sufficient to guide the pipe axially during the axial movement or expansion of the pipe and to accommodate the lateral motion of the pipe while maintaining the fire seal;
    one or more connectors attaching the baseplate to a substrate;
    wherein the pipe extends through an aperture in the substrate;
    the bellows having a first length in a first position and a second length in a second position; and
    wherein the bellows is configured to move from the first position to the second position upon axial expansion of the pipe.

14. The sealing system of claim 13, further comprising a shroud positioned adjacent to the baseplate and extending around the bellows.

15. The sealing system of claim 13, further comprising a kerfed tube around the pipe abutting the second end of the bellows.

16. The sealing system of claim 15, further comprising a U-bolt fixed around the kerfed tube.

17. The sealing system of claim 13, wherein the substrate is a wall.

18. The sealing system of claim 13, wherein the substrate is a floor.

19. The sealing system of claim 13, further comprising a sealant between the aperture in the substrate and the pipe.

20. The sealing system of claim 19, wherein the sealant is fire resistant.

21. The sealing system of claim 19, wherein the sealant is waterproof.

22. The sealing system of claim 1, wherein the inner diameter of the inner ring is smaller than an inner diameter of the flexible bellows.

23. The sealing system of claim 1, wherein the base plate having an inner ring is composed of stainless steel.

24. The sealing system of claim 13, wherein the inner diameter of the inner ring is smaller than an inner diameter of the flexible bellows.

25. The sealing system of claim 13, wherein the base plate having an inner ring is composed of stainless steel.

\* \* \* \* \*